United States Patent
Ryu et al.

(10) Patent No.: US 9,553,707 B2
(45) Date of Patent: Jan. 24, 2017

(54) METHOD FOR TRANSMITTING AND RECEIVING DATA IN WIRELESS ACCESS SYSTEM AND APPARATUS FOR SAME

(71) Applicants: LG ELECTRONICS INC., Seoul (KR); RESEARCH & BUSINESS FOUNDATION SUNGKYUNKWAN UNIVERSITY, Suwon-si, Gyeonggi-do (KR)

(72) Inventors: Jongyeol Ryu, Daejeon (KR); Wan Choi, Seoul (KR); Dongin Kim, Seongnam-si (KR); Hanbyul Seo, Anyang-si (KR)

(73) Assignees: LG ELECTRONICS INC., Seoul (KR); RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 30 days.

(21) Appl. No.: 14/377,121

(22) PCT Filed: Nov. 6, 2012

(86) PCT No.: PCT/KR2012/009275
§ 371 (c)(1),
(2) Date: Aug. 6, 2014

(87) PCT Pub. No.: WO2013/125766
PCT Pub. Date: Aug. 29, 2013

(65) Prior Publication Data
US 2015/0029926 A1 Jan. 29, 2015

Related U.S. Application Data

(60) Provisional application No. 61/600,709, filed on Feb. 20, 2012.

(51) Int. Cl.
*H04L 5/00* (2006.01)
*H04L 1/18* (2006.01)
(Continued)

(52) U.S. Cl.
CPC ............. *H04L 5/0055* (2013.01); *H04B 7/024* (2013.01); *H04B 7/026* (2013.01); *H04B 7/0452* (2013.01);
(Continued)

(58) Field of Classification Search
CPC ....... H04B 7/024; H04B 7/026; H04B 7/0452; H04B 7/0456; H04B 7/0623; H04L 1/1861; H04L 5/0023; H04L 5/0037; H04L 5/0055; H04W 72/005
See application file for complete search history.

(56) References Cited

U.S. PATENT DOCUMENTS

2009/0048569 A1  2/2009  Chen et al.
2009/0129496 A1  5/2009  Zhang et al.
(Continued)

FOREIGN PATENT DOCUMENTS

KR  10-2009-0097761 A  9/2009
KR  10-2010-0064191 A  6/2010

*Primary Examiner* — Khaled Kassim
*Assistant Examiner* — Zhaohui Yang
(74) *Attorney, Agent, or Firm* — Birch, Stewart, Kolasch & Birch, LLP

(57) ABSTRACT

Disclosed are a method for transmitting and receiving data in a wireless access system supporting relay nodes, and an apparatus for same. In particular, the present invention comprises: a broadcast phase for receiving an acknowledgement (ACK) signal from a first terminal and a negative acknowledgement (NACK) signal from a second terminal, after a base station transmits first data to the first terminal by using a first precoding vector (w1, B), and second data to the second terminal by using a second precoding vector (w2, B);
(Continued)

a listening phase for receiving an ACK signal from the first terminal and a NACK signal from the second terminal, after the base station transmits second data to the first and second terminals by using a third precoding vector (wL); and a cooperative phase for the base station to transmit the second data to the second terminal, in cooperation with the first terminal, by using a fourth precoding vector (wC) which has been chosen for maximizing the transmission efficiency of the second terminal, wherein the first precoding vector, the second precoding vector, and the third precoding vector are chosen so that the total length of the rounds of all phases is minimized.

8 Claims, 10 Drawing Sheets

(51) Int. Cl.
| | | |
|---|---|---|
| H04B 7/02 | (2006.01) | |
| H04B 7/04 | (2006.01) | |
| H04B 7/06 | (2006.01) | |
| H04W 72/00 | (2009.01) | |
| H04L 1/00 | (2006.01) | |

(52) U.S. Cl.
CPC .......... *H04B 7/0456* (2013.01); *H04B 7/0623* (2013.01); *H04L 1/1845* (2013.01); *H04L 1/1861* (2013.01); *H04L 5/0023* (2013.01); *H04L 5/0037* (2013.01); *H04W 72/005* (2013.01); *H04L 2001/0097* (2013.01)

(56) References Cited

U.S. PATENT DOCUMENTS

| | | | |
|---|---|---|---|
| 2010/0180170 A1* | 7/2010 | Seo | H04B 7/0691 714/748 |
| 2011/0014865 A1 | 1/2011 | Seo et al. | |
| 2011/0032839 A1* | 2/2011 | Chen | H04B 7/024 370/252 |
| 2011/0176478 A1* | 7/2011 | Inohiza | H04B 7/155 370/315 |
| 2011/0294415 A1 | 12/2011 | Jeon et al. | |
| 2012/0287965 A1* | 11/2012 | Sambhwani | H04B 7/0413 375/141 |

\* cited by examiner

METHOD FOR TRANSMITTING AND RECEIVING DATA IN WIRELESS ACCESS SYSTEM AND APPARATUS FOR SAME

CROSS REFERENCE TO RELATED APPLICATIONS

This application is the National Phase of PCT International Application No. PCT/KR2012/009275, filed on Nov. 6, 2012, which claims priority under 35 U.S.C. 119(e) to U.S. Provisional Application No. 61/600,709, filed on Feb. 20, 2012, all of which are hereby expressly incorporated by reference into the present application.

TECHNICAL FIELD

The present invention relates to a wireless access system and, more specifically, to a method for transmitting and receiving data in a wireless access system supporting relay nodes and an apparatus supporting the same.

BACKGROUND ART

FIG. 1 illustrates a relay node (RN) and UEs located in the area of one eNB in a wireless communication system. A relay node refers to a node that receives a signal transmitted from a source node and wirelessly relays the signal to a destination node. The relay node can be considered for improvement of data rates of UEs, group mobility, temporary network disposition, throughput improvement in a cell edge area and/or provision of coverage in a new area. A UE can directly communicate with the eNB or perform communication with the eNB over two hops through the relay node.

The relay node transmits data received from the eNB to a UE located in the area of the relay node and transmits data received from the UE to the eNB. In the following description, a radio link between an eNB and a relay node is referred to as a backhaul link, a link from the eNB to the relay node is referred to as a backhaul downlink and a link from the relay node to the eNB is referred to as a backhaul uplink for convenience. In addition, a radio link between a relay node and a UE is referred to as an access link, a link from the relay node to the UE is referred to as an access downlink and a link from the UE to the relay node is referred to as an access uplink.

DISCLOSURE

Technical Problem

An object of the present invention devised to solve the problem lies in a method for improving retransmission efficiency of a system through cooperation among UEs or through cooperative transmission using a relay node in a multi-antenna downlink environment. Specifically, the present invention provides a method by which a UE that has rapidly achieved a target rate according to channel environment receives information about other UEs, stored therein, or information about other UEs from an eNB and performs retransmission to a UE that has not finished transmission due to relatively poor channel environment, using the received information, when UEs respectively have target rates. In addition, the present invention provides a method for designing a precoding scheme for optimization of retransmission efficiency of the system in consideration of retransmission through cooperation among UEs.

The technical problems solved by the present invention are not limited to the above technical problems and those skilled in the art may understand other technical problems from the following description.

Technical Solution

The object of the present invention can be achieved by providing a method for transmitting data in a wireless access system, including: a broadcast phase for receiving an acknowledgement (ACK) signal from a first UE and receiving a negative acknowledgement (NACK) signal from a second UE, after a base station (BS) transmits first data to the first UE using a first precoding vector $w_{1,B}$ and transmits second data to the second UE using a second precoding vector $w_{2,B}$; a listening phase for receiving an ACK signal from the first UE and receiving a NACK signal from the second UE, after the BS transmits the second data to the first UE and the second UE using a third precoding vector $w_L$; and a cooperative phase for transmitting, by the BS, the second data to the second UE, in cooperation with the first UE, using a fourth precoding vector $w_C$ determined to maximize transmission efficiency of the second UE, wherein the first precoding vector, the second precoding vector and the third precoding vector are determined so as to minimize a total length of rounds of all phases.

In another aspect of the present invention, provided herein is a BS configured to transmit data in a wireless access system, including: a radio frequency (RF) unit configured to transmit and receive radio signals; and a processor configured to control a broadcast phase for receiving an ACK signal from a first UE and receiving a NACK signal from a second UE, after the BS transmits first data to the first UE using a first precoding vector $w_{1,B}$ and transmits second data to the second UE using a second precoding vector $w_{2,B}$, to control a listening phase for receiving an ACK signal from the first UE and receiving a NACK signal from the second UE, after the BS transmits the second data to the first UE and the second UE using a third precoding vector $w_L$; and to control a cooperative phase for transmitting the second data to the second UE, in cooperation with the first UE, using a fourth precoding vector $w_C$ determined to maximize transmission efficiency of the second UE, wherein the first precoding vector, the second precoding vector and the third precoding vector are determined so as to minimize a total length of rounds of all the phases.

A round length $l_B$ of the broadcast phase, a round length $l_L$ of the listening phase and a round length $l_C$ of the cooperative phase may be determined by Equations 1 and 2, $$l_B = \frac{R_1}{R_{1,B}^{(1)}}, \qquad \langle \text{Equation 1} \rangle$$

$$l_L = \frac{R_2 - l_B R_{1,B}^{(2)}}{R_{1,L}} = \frac{R_2 - R_1 \frac{R_{1,B}^{(2)}}{R_{1,B}^{(1)}}}{R_{1,L}},$$

$$l_C = \frac{R_2 - l_B R_{2,B} - l_L R_{2,L}}{R_{2,C}}$$

$$= \frac{R_2 - R_1 \frac{R_{2,B}}{R_{1,B}^{(1)}} - \frac{R_{2,L}}{R_{1,L}}\left(R_2 - R_1 \frac{R_{1,B}^{(2)}}{R_{1,B}^{(1)}}\right)}{R_{2,C}},$$

-continued $$R_{1,B}^{(1)} = \log\left(1 + \frac{P_1|h_1^T w_{1,B}|^2}{\sigma^2 + P_2|h_1^T w_{2,B}|^2}\right),$$ ⟨Equation 2⟩

$$R_{1,B}^{(2)} = \log\left(1 + \frac{P_2|h_1^T w_{2,B}|^2}{\sigma^2}\right),$$

$$R_{2,B} = \log\left(1 + \frac{P_2|h_2^T w_{2,B}|^2}{\sigma^2 + P_1|h_2^T w_{1,B}|^2}\right),$$

$$R_{1,L} = \log\left(1 + \frac{P_T|h_1^T w_L|^2}{\sigma^2}\right),$$

$$R_{2,L} = \log\left(1 + \frac{P_T|h_2^T w_L|^2}{\sigma^2}\right),$$

$$R_{2,C} = \log\left(1 + \frac{P_T|h_2^T w_C|^2 + P_{U_1}|h_{12}|^2}{\sigma^2}\right)$$

$$= \log\left(1 + \frac{P_T\|h_2^T\|^2 + P_{U_1}|h_{12}|^2}{\sigma^2}\right).$$

wherein $P_1$ and $P_2$ respectively denote powers of signals transmitted from the BS to the first UE and from the BS to the second UE, $P_T$ denotes power of a signal transmitted from the BS in the listening phase and the cooperative phase, $h_1$ and $h_2$ respectively represent a channel from the BS to the first UE and a channel from the BS to the second UE, and $\sigma$ represents power of additive white Gaussian noise.

The third precoding vector $w_L$ may be determined by Equation 3.

$$\min_{\|w_L\|^2=1} \mathcal{J}_L = \frac{R_{2,C} - R_{2,L}}{R_{1,L}}$$ ⟨Equation 3⟩

The fourth precoding vector $w_C$ may be determined by Equation 4, $$\min_{\|w_{1,B}\|^2=\|w_{2,B}\|^2=1} \mathcal{J}_{co} = \frac{R_{2,C} - R_{2,B}}{R_{1,B}^{(1)}} = \mathcal{J}_L^*\left(\frac{R_2}{R_1} - \frac{R_{1,B}^{(2)}}{R_{1,B}^{(1)}}\right)$$ ⟨Equation 4⟩ wherein $\mathcal{J}_L^*$ denotes a value determined by Equation 3.

Advantageous Effects

According to embodiments of the present invention, retransmission of information of a UE having a poor channel environment can be performed through a channel of a UE having a relatively good channel environment to improve transmission efficiency of the system. A UE having a high-quality channel can transmit information of other UEs using unused resources after achieving the target rate thereof to maximize resource utilization efficiency. In addition, a relay user can receive information of other UEs, transmitted form an eNB, and aid the eNB in transmitting information after successful restoration of the information of other UEs so as to improve transmission efficiency. The eNB can design precoding vectors optimized for this operation to minimize the number of retransmission rounds used to decode information of all UEs and to maximize transmission efficiency of the system.

Furthermore, the present invention is applicable to cooperative communication using a conventional relay node as well as a UE-relay environment. The eNB can design precoding vectors for optimizing system transmission efficiency in consideration of not only channels to UEs but also cooperative communication using a relay node. When retransmission is performed using the designed precoding vectors, the number of rounds used for retransmission can be minimized to improve transmission efficiency of the system.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings.

BEST MODE

Figure 1:
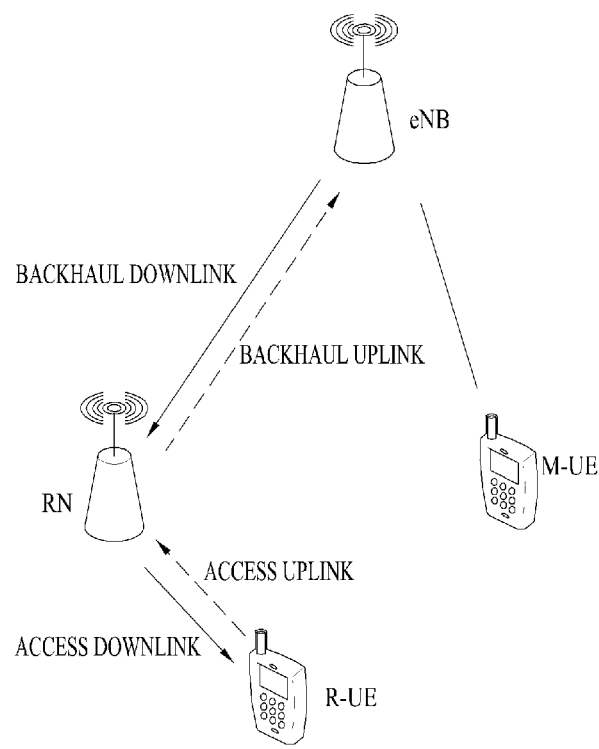
FIG. 1 illustrates a wireless communication system including a relay node and UEs.

Reference will now be made in detail to the exemplary embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some cases, to prevent the concept of the present invention from being ambiguous, structures and apparatuses of the known art will be omitted, or will be shown in the form of a block diagram based on main functions of each structure and apparatus.

In the embodiments of the present invention, a description is made, centering on a data transmission and reception relationship between a base station (BS) and a user equipment (UE). The BS is a terminal node of a network, which communicates directly with a UE. In some cases, a specific operation described as performed by the BS may be performed by an upper node of the BS. Namely, it is apparent that, in a network including a plurality of network nodes including a BS, various operations performed for communication with a UE may be performed by the BS, or network nodes other than the BS. The term "BS" may be replaced with the term 'fixed station', 'Node B', 'eNode B (eNB)', 'access point (AP)', etc. The term 'relay' may be replaced with the term 'relay node (RN)', relay station (RS)', etc. The term 'UE' may be replaced with the term 'terminal', 'mobile station (MS)', 'mobile subscriber station (MSS)', 'subscriber station (SS)', 'advanced mobile station (AMS)', 'wireless terminal (WT)', 'machine-type communication (MTC) device', 'machine-to-machine (M2M) device', 'device-to-device (D2D) device', etc.

Specific terms used for the embodiments of the present invention are provided to help the understanding of the present invention. These specific terms may be replaced with other terms within the scope and spirit of the present invention.

The embodiments of the present invention can be supported by standard documents disclosed for at least one of wireless access systems, Institute of Electrical and Electronics Engineers (IEEE) 802, 3GPP, 3GPP LTE, LTE-A and 3GPP2. Steps or parts that are not described to clarify the technical features of the present invention can be supported by those documents. Further, all terms as set forth herein can be explained by the standard documents.

Techniques described herein can be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink. LTE-A evolves from 3GPP LTE.

For clarity, this application focuses on the 3GPP LTE/LTE-A system. However, the technical features of the present invention are not limited thereto.

Figure 2:
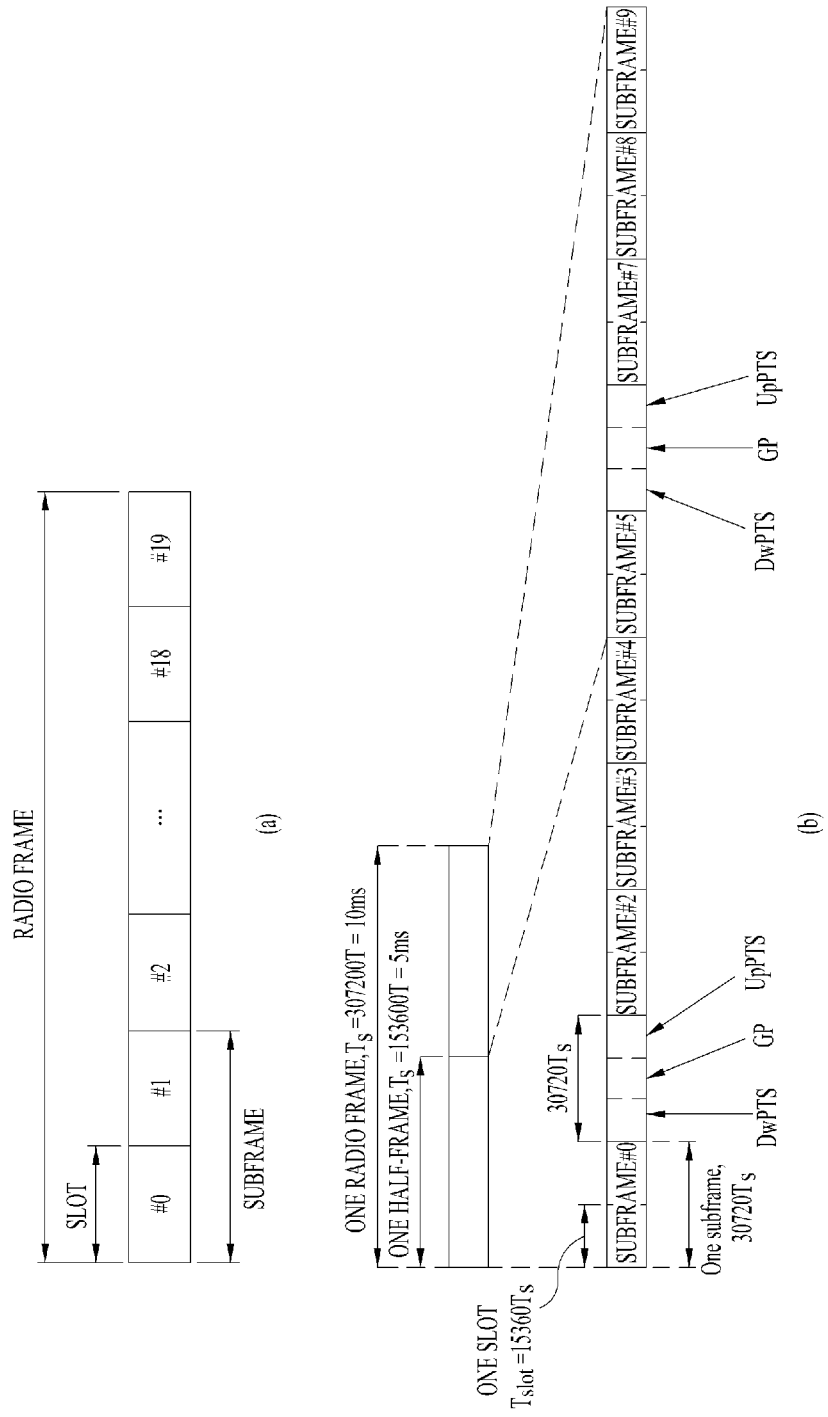
FIG. 2 illustrates a radio frame structure in 3GPP LTE.

1. Overview of 3GPP LTE/LTE-A System to which the Present Invention is Applicable 1.1 Overview of System FIG. 2 illustrates a radio frame structure in 3GPP LTE.

In a cellular OFDM wireless packet communication system, uplink/downlink data packet transmission is performed on a subframe basis. One subframe is defined as a predetermined period including a plurality of OFDM symbols. 3GPP LTE supports type-1 radio frame applicable to frequency division duplex (FDD) and type-2 radio frame applicable to time division duplex (TDD).

FIG. 2(a) illustrates a type-1 radio frame structure. A downlink subframe includes 10 subframes each of which includes 2 slots in the time domain. A time for transmitting a subframe is defined as a transmission time interval (TTI). For example, each subframe has a length of 1 ms and each slot has a length of 0.5 ms. A slot includes a plurality of OFDM symbols in the time domain and includes a plurality of resource blocks (RBs) in the frequency domain. Since downlink uses OFDM in 3GPP LTE, an OFDM symbol represents a symbol period. The OFDM symbol may be called an SC-FDMA symbol or symbol period. An RB as a resource allocation unit may include a plurality of consecutive subcarriers in one slot.

The number of OFDM symbols included in one slot may depend on cyclic prefix (CP) configuration. CPs include an extended CP and a normal CP. When an OFDM symbol is configured with the normal CP, for example, the number of OFDM symbols included in one slot may be 7. When an OFDM symbol is configured with the extended CP, the length of one OFDM symbol increases, and thus the number of OFDM symbols included in one slot is smaller than that in case of the normal CP. In case of the extended CP, the number of OFDM symbols allocated to one slot may be 6. When a channel state is unstable, such as a case in which a UE moves at a high speed, the extended CP can be used to reduce inter-symbol interference.

When the normal CP is used, one subframe includes 14 OFDM symbols since one slot has 7 OFDM symbols. The first three OFDM symbols at most in each subframe can be allocated to a PDCCH and the remaining OFDM symbols can be allocated to a PDSCH.

FIG. 2(b) illustrates a type-2 radio frame structure. The type-2 radio frame includes 2 half frames. Each half frame includes 5 subframes each of which is composed of 2 slots. A special subframe from among the 5 subframes includes a downlink pilot time slot (DwPTS), a guard period (GP), and an uplink pilot time slot (UpPTS). The DwPTS is used for initial cell search, synchronization or channel estimation. The UpPTS is used for channel estimation in a BS and UL transmission synchronization acquisition in a UE. The GP eliminates UL interference caused by multi-path delay of a DL signal between a UL and a DL.

The radio frame structure is merely exemplary and the number of subframes included in the radio frame, the number of slots included in a subframe, and the number of symbols included in a slot can be vary.

Figure 3:
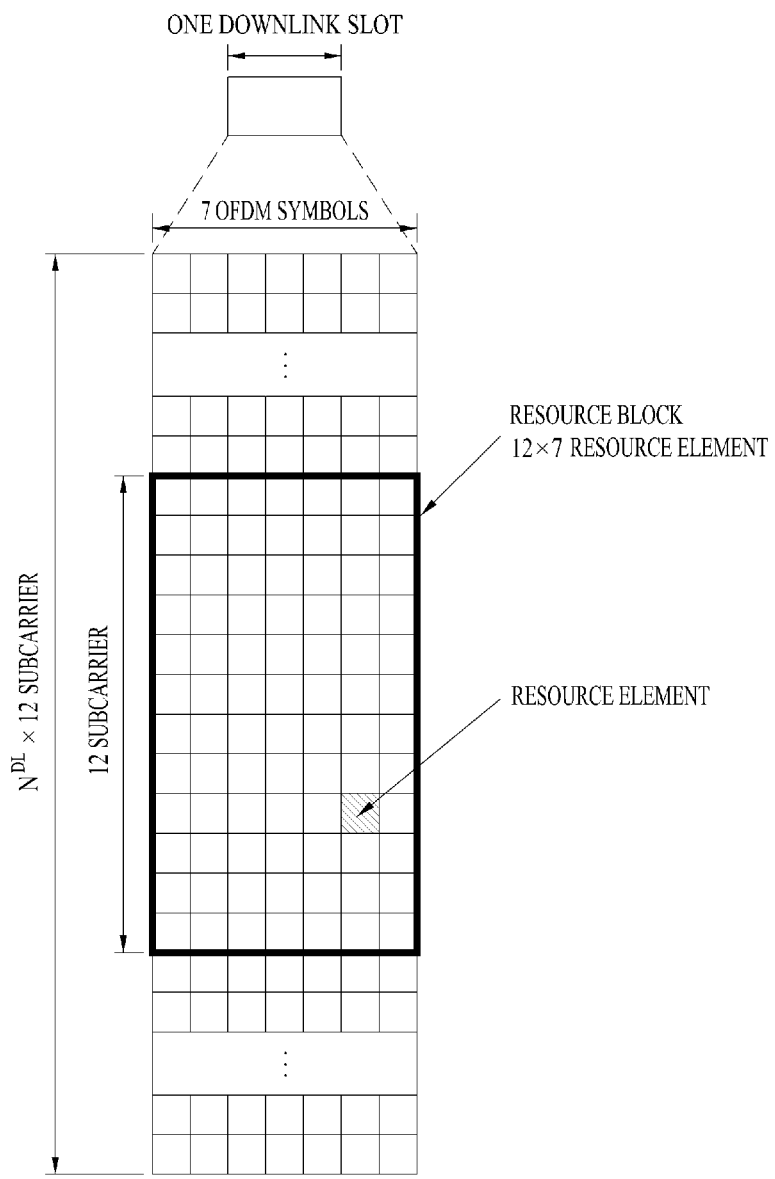
FIG. 3 illustrates a resource grid of one downlink slot.

FIG. 3 illustrates a resource grid of a downlink slot.

Referring to FIG. 3, a downlink slot includes a plurality of OFDM symbols in the time domain. One downlink slot may include 7 OFDM symbols, and one resource block (RB) may include 12 subcarriers in the frequency domain.

Each element on the resource grid is referred to as a resource element (RE). One RB includes 12×7 REs. The number NDL of RBs included in the downlink slot depends on a downlink transmit bandwidth. The structure of an uplink slot may be same as that of the downlink slot.

Figure 4:
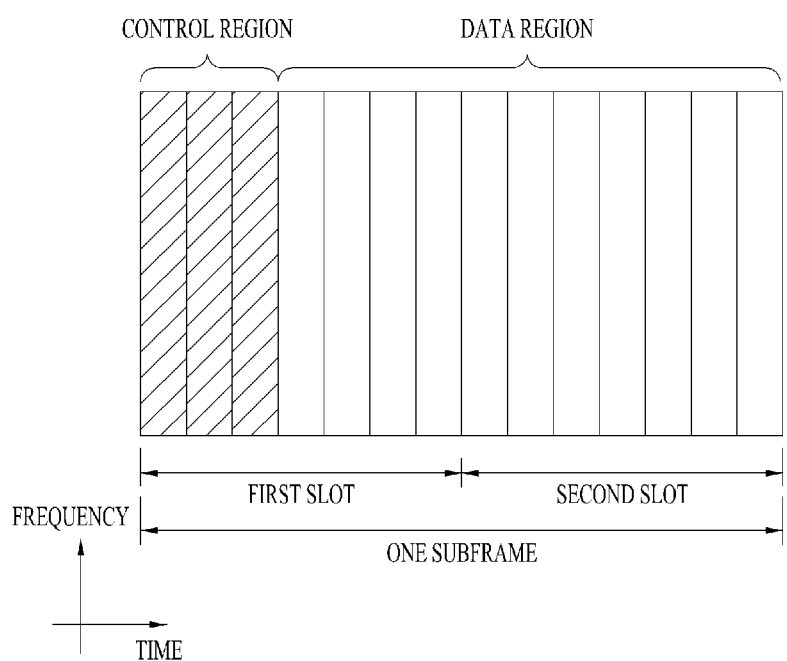
FIG. 4 illustrates a downlink subframe structure.

FIG. 4 illustrates a downlink subframe structure.

Referring to FIG. 4, a maximum of three OFDM symbols located in a front portion of a first slot within a subframe correspond to a control region to which a control channel is allocated. The remaining OFDM symbols correspond to a data region to which a physical downlink shared chancel (PDSCH) is allocated. Examples of downlink control channels used in 3GPP LTE include a physical control format indicator channel (PCFICH), a physical downlink control channel (PDCCH), a physical hybrid ARQ indicator channel (PHICH), etc.

The PCFICH is transmitted at a first OFDM symbol of a subframe and carries information regarding the number of OFDM symbols used for transmission of control channels within the subframe (i.e. control region size). The PHICH is a response of uplink transmission and carries an HARQ acknowledgment (ACK)/negative-acknowledgment (NACK) signal. Control information transmitted through the PDCCH is referred to as downlink control information (DCI). DCI includes uplink resource allocation information, downlink resource allocation information or uplink transmit power control commands for an arbitrary UE group.

Figure 5:
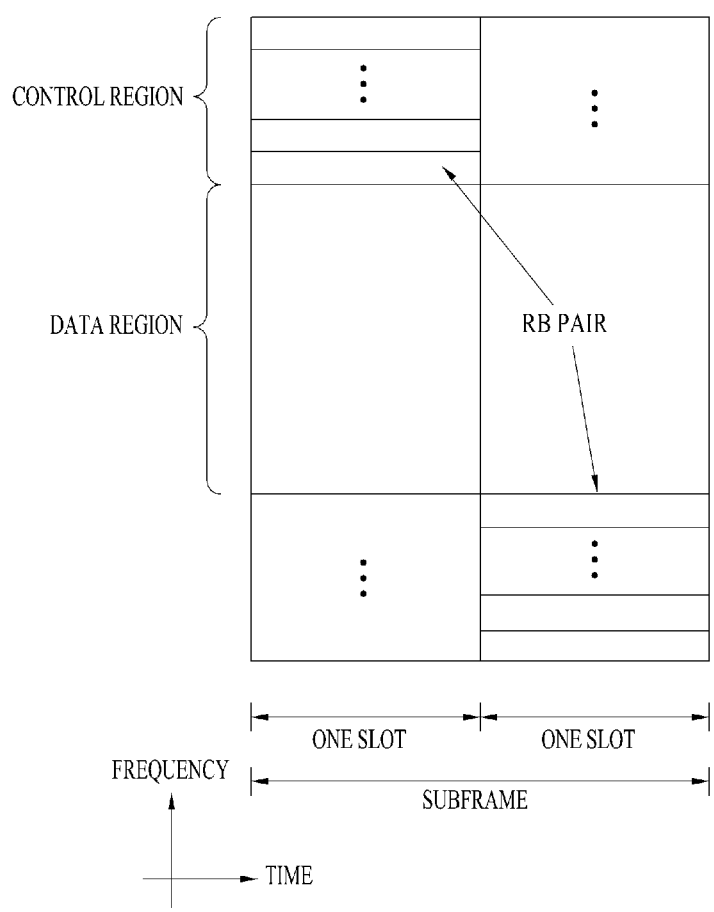
FIG. 5 illustrates an uplink subframe structure.

FIG. 5 illustrates an uplink subframe structure.

Referring to FIG. 5, an uplink subframe may be divided into a control region and a data region in the frequency domain. The control region is allocated a PUCCH carrying uplink control information. The data region is allocated a PUSCH carrying user data. To maintain single carrier property, one UE does not simultaneously transmit a PUCCH and a PUSCH. An RB pair is allocated in a subframe for a PUCCH corresponding to a UE. RBs belonging to an RB pair respectively occupy different subcarriers in two slots. An RB pair allocated to a PUCCH is frequency-hopped in a slot boundary.

1.2 MIMO System

Figure 6:
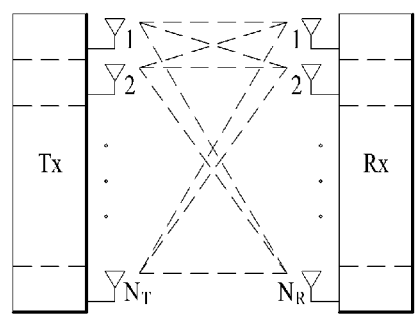
FIGS. 6 and 7 illustrate data transmission operation in a multi-antenna downlink environment.
Figure 7:
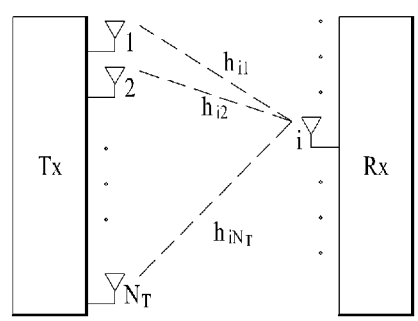

FIGS. 6 and 7 illustrate configurations of wireless communication systems including multiple antennas.

Referring to FIG. 6, when the number of Tx antennas and the number of Rx antennas are respectively increased to $N_T$ and $N_R$, a theoretical channel transmission capacity is increased, compared to use of a plurality of antennas at only one of a transmitter and a receiver. Therefore, transmission rate and frequency efficiency can be increased remarkably. As channel transmission capacity increases, transmission rate may be increased, in theory, to the product of a maximum transmission rate $R_o$ that is achieved with a single antenna and a transmission rate increase rate $R_i$.

$$R_i = \min(N_T, N_R) \quad \text{[Equation 1]}$$

For instance, a MIMO communication system using 4 Tx antennas and 4 Rx antennas may achieve a four-fold increase in transmission rate theoretically, relative to a single-antenna system. After the above-mentioned theoretical capacity increase of the MIMO system was demonstrated in the mid-1990s, many developers began to conduct intensive research into a variety of technologies which can substantially increase data transfer rate using the theoretical capacity increase. Some of the above technologies have been reflected in a variety of wireless communication standards, for example, third-generation mobile communication or next-generation wireless LAN, etc.

A variety of MIMO-associated technologies have been intensively researched by many companies or developers, for example, research into information theory associated with MIMO communication capacity under various channel environments or multiple access environments, research into a radio frequency (RF) channel measurement and modeling of the MIMO system, and research into a space-time signal processing technology.

Mathematical modeling of a communication method for use in the MIMO system will hereinafter be described in detail. It is assumed that there are $N_T$ Tx antennas and $N_R$ Rx antennas.

In the case of a transmission signal, a maximum number of transmission information pieces is $N_T$ under the condition that $N_T$ Tx antennas are used. The transmission information can be represented as follows.

$$s = [s_1, s_2, \ldots, s_{N_T}]^T \quad \text{[Equation 2]}$$

Individual transmission information pieces $s_1, s_2, \ldots, s_{N_T}$ may have different transmission powers. In this case, if the individual transmission powers are denoted by $P_1, P_2, \ldots, P_{N_T}$, then transmission information having an adjusted transmission power can be represented as follows.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In Equation 3, $\hat{s}$ can be represented by the following equation using a diagonal matrix P of a transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

The information vector $\hat{s}$ having an adjusted transmission power is applied to a weight matrix W, so that $N_T$ transmission signals $x_1, x_2, \ldots, x_{N_T}$ to be actually transmitted are configured. In this case, the weight matrix W is adapted to properly distribute transmission information to individual antennas according to transmission channel situations. The above-mentioned transmission signals $x_1, x_2, \ldots, x_{N_T}$ can be represented by the following equation using the vector X.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

Here, $W_{ij}$ denotes a weight corresponding to i-th Tx antenna and j-th information. W represents a precoding matrix.

When $N_R$ Rx antennas are used, received signals $y_1, y_2, \ldots, y_{N_R}$ of individual antennas can be represented by a specific vector shown in the following equation.

$$y = [y_1, y_2, \ldots, y_{N_R}]^T \quad \text{[Equation 6]}$$

When a channel modeling is executed in the MIMO communication system, individual channels can be distinguished from each other according to Tx/Rx antenna indexes. A specific channel passing the range from a Tx antenna j to a Rx antenna i is denoted by $h_{ij}$. In this case, it should be noted that the index order of the channel $h_{ij}$ is located before a Rx antenna index and is located after a Tx antenna index.

FIG. 7 shows channels from $N_T$ Tx antennas to an Rx antenna i. Several channels are tied up, so that they are displayed in the form of a vector or matrix. Referring to FIG. 7, the channels passing the range from the $N_T$ Tx antennas to the Rx antenna i can be represented by the following equation.

$$h_i^T = [h_{i1}, h_{i2}, \ldots, h_{iN_T}] \quad \text{[Equation 7]}$$

All channels passing the range from the $N_T$ Tx antennas to $N_R$ Rx antennas can be represented as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \quad \text{[Equation 8]}$$

Additive white Gaussian noise (AWGN) is added to an actual channel which has passed the channel matrix H. The AWGN $n_1, n_2, \ldots, n_{N_R}$ added to each of $N_R$ Rx antennas can be represented as follows.

$$n = [n_1, n_2, \ldots, n_{N_R}]^T \quad \text{[Equation 9]}$$

A reception signal calculated by the above-mentioned equations can be represented as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n \quad \text{[Equation 10]}$$

In the meantime, the number of rows and the number of columns of a channel matrix H indicating a channel condition are determined by the number of Tx/Rx antennas. In the channel matrix H, the number of rows is equal to the number ($N_R$) of Rx antennas, and the number of columns is equal to the number ($N_T$) of Tx antennas. Namely, the channel matrix H is denoted by an $N_R \times N_T$ matrix.

A matrix rank is defined by a smaller number between the number of rows and the number of columns, in which the rows and the columns are independent of each other. Therefore, the matrix rank cannot be higher than the number of rows or columns. The rank of the channel matrix H can be represented by the following equation.

$$\text{rank}(H) \leq \min(N_T, N_R) \quad \text{[Equation 11]}$$

The rank may be defined as the number of non-zero Eigen values when Eigen value decomposition is performed on the matrix. Similarly, the rank may be defined as the number of non-zero singular values when singular value decomposition is performed on the matrix. Accordingly, the rank of the channel matrix refers to a maximum number of information pieces that can be transmitted on a given channel.

1.3. Multiple User-MIMO

Multiple user-MIMO (MU-MIMO) refers to operation of an eNB including multiple antennas to simultaneously serve multiple users (UEs). When multiple users are simultaneously served by one eNB, a signal transmitted to one UE may be applied as interference to another UE and thus system performance may be deteriorated. Accordingly, it is necessary to remove interference between users to perform correct data transmission and reception according to MU-MIMO. To achieve this, the eNB may perform signal processing on signals to be transmitted to multiple users according to an interference cancellation scheme.

The eNB may encode information blocks to be transmitted to UEs into independent codewords. The encoded codewords may be transmitted according to an interference cancellation scheme. For example, the eNB can pre-cancel interference for codewords to be transmitted to multiple UEs and transmit the interference-cancelled codewords. Specifically, when a signal transmitted to one UE $U_1$ is pre-subtracted from a signal transmitted to another UE $U_2$, the UE $U_2$ can receive the signal from the eNB without interference. Zero forcing-dirty paper coding (ZF-DPC), zero forcing (ZF) or the like can be used as an interference cancellation method.

ZF-DPC is described first. When 2 UEs, $U_1$ and $U_2$, are simultaneously served by one eNB, a composite channel $H = [h_1\ h_2]$ of a channel $h_1$ of $U_1$ and a channel $h_2$ of $U_2$ can be considered. When LQ decomposition is performed on the composite channel H, the composite channel H is decomposed into a lower triangular matrix L and an orthogonal matrix Q, as represented by the following equation 12.

$$H = LQ = \begin{bmatrix} l_{11} & 0 \\ l_{21} & l_{22} \end{bmatrix} \begin{bmatrix} q_{11} & q_{12} \\ q_{21} & q_{22} \end{bmatrix} \quad \text{[Equation 12]}$$

In Equation 12, when MIMO transmission is performed using columns of the matrix Q as a beamforming vector, only the lower triangular matrix L remains in a signal received by a UE. If the eNB knows channel environments of all UEs, then the eNB can perform encoding in such a manner that the eNB transmits a component encoded without interference of the first row, avoiding an interference component of the second row. Here, when beamforming vector $w_i$ for each UE (that is, a beamforming vector for $U_1$ is $w_1$ and a beamforming vector for $U_2$ is $w_2$) corresponds to $w_i = q_i$, an effective channel can be represented by the following equation 13. Accordingly, since interference from a signal transmitted to one UE can be pre-eliminated from a signal to be transmitted to another UE and then the signals can be transmitted, the corresponding UE can correctly receive the signal from the eNB without an additional interference cancellation operation.

$$h_i w_k = \begin{cases} l_{ii} & i = k \\ 0 & i \neq k \end{cases} \quad \text{[Equation 13]}$$

In the case of ZF beamforming, interference cancellation can be performed through pseudo-inverse transform for a composite channel H with respect to multiple UEs, as represented by the following equation 14.

$$F = H^H (HH^H)^{-1} \quad \text{[Equation 14]}$$

In Equation 14, $X^H$ denotes a Hermitian matrix with respect to matrix X and $X^{-1}$ denotes an inverse of matrix X. The columns of matrix F of Equation 4 correspond to beamforming vectors for respective UEs. That is, $w_i = f_i$. In this case, the effective channel for each UE can be represented by the following equation 15.

$$h_i w_k = \begin{cases} \dfrac{1}{\|w_i\|} & i = k \\ 0 & i \neq k \end{cases} \quad \text{[Equation 15]}$$

When ZF is used, a channel for each UE becomes an identity matrix, and thus UEs can receive signals from which interference has been pre-cancelled.

1.4. Relay Node (RN)

Referring back to FIG. 1, the RN transmits data transmitted and received between the eNB and a UE through two different links (a backhaul link and an access link). The eNB may include a donor cell. The RN is wirelessly connected to the corresponding wireless access network through the donor cell.

With regard to use of the band (or spectrum) of an RN, a case in which a backhaul link and an access link operate in the same frequency band is referred to as 'in-band' and a case in which the backhaul link and the access link operate in different frequency bands is referred to as 'out-band'. In both in-band and out-band cases, a UE (referred to as a legacy UE hereinafter) operating in LTE needs to be connected to a donor cell.

An RN can be classified as a transparent RN or a non-transparent RN according to whether a UE recognizes the RN. In the case of transparent RN, the UE cannot recognize communication with a network through the RN. In the case of non-transparent RN, the UE recognizes communication with the network through the RN.

With regard to control of RNs, RNs can be classified into an RN configured as part of a donor cell and an RN controlling a cell.

While the RN configured as part of the donor cell may have a relay node ID (relay ID), the RN does not have a cell ID thereof. When at least part of radio resource management (RRM) is controlled by an eNB belonging to the donor cell, even if the remaining parts of RRM correspond to the RN, the RN is regarded as an RN configured as part of the donor cell. This RN can support legacy UEs. For example, smart repeaters, decode-and-forward relays, L2 relay nodes and type-2 relay node correspond to the aforementioned RN.

In the case of the RN controlling a cell, the RN controls one or more cells and each cell controlled by the RN is assigned a physical layer cell ID. Cells controlled by the RN can use the same RRM mechanism. There is no difference between access of a cell controlled by an RN and access of a cell controlled by a normal eNB from the viewpoint of UE. Cells controlled by the RN can support legacy UEs. For example, a self-backhauling relay node, L3 relay node, type-1 relay node and type-1a relay node correspond to the relay node controlling cells.

The type-1 relay node as an in-band relay node controls a plurality of cells, and the cells are regarded as cells distinguished from a donor cell from the viewpoint of a UE. In addition, the cells respectively have physical cell IDs thereof (which is defined in LTE release-8) and the relay node can transmit a synchronization channel thereof, a reference signal, etc. In the case of single-cell operation, the UE can directly receive scheduling information and HARQ feedback from the relay node and transmit a control channel thereof (scheduling request, CQI, ACK/NACK and the like) to the relay node. Legacy UEs (UEs operating in LTE release-8) regard the type-1 relay node as a legacy eNB (eNB operating in LTE release-8). That is, the type-1 relay node has backward compatibility. For UEs operating in LTE-A, the type-1 relay node is regarded as an eNB different from legacy UEs and thus performance improvement can be provided.

The type-1 a relay node has the same characteristics as those of the type-1 relay node except that the type-1a relay node operates as an out-band relay node. Operations of the type-1a relay nodes can be configured such that influence on L1 (first layer) operations is minimized or eliminated.

The type-2 relay node is an in-band relay node and does not have a physical cell ID and thus the type-2 relay node does not form a new cell. The type-2 relay node is transparent with respect to legacy UEs and thus the legacy UEs cannot recognize presence of the type-2 relay node. While the type-2 relay node can transmit a PDSCH, the type-2 relay node does not transmit a CRS and a PDCCH.

For in-band operation of a relay node, some resources in the time-frequency domain need to be reserved for a backhaul link and can be set such that they are not used for an access link. This is referred to as resource partitioning.

General principles of resource partitioning in a relay node will now be described. A backhaul downlink and an access downlink can be multiplexed at a carrier frequency according to time division multiplexing (TDM) (that is, only one of the backhaul downlink and the access downlink is activated at a specific time). Similarly, a backhaul uplink and an access uplink can be multiplexed at a carrier frequency according to TDM (that is, only one of the backhaul uplink and the access uplink is activated at a specific time).

With respect to backhaul link multiplexing in FDD, backhaul downlink transmission can be performed in a downlink frequency band and backhaul uplink transmission can be performed in an uplink frequency band. With regard to backhaul link multiplexing in TDD, backhaul downlink transmission can be performed in downlink subframes of an eNB and a relay node and backhaul uplink transmission can be performed in uplink subframes of the eNB and the relay node.

In the case of the in-band relay node, when backhaul downlink reception from an eNB and access downlink transmission to a UE are simultaneously performed in the same frequency band, for example, signal interference may be generated at a receiver of the relay node due to a signal transmitted from a transmitter of the relay node. That is, signal interference or RF jamming may occur at an RF front-end of the relay node. Similarly, signal interference may occur when backhaul uplink transmission to the eNB and access uplink reception from the UE are simultaneously performed in the same frequency band.

Accordingly, to simultaneously transmit and receive signals in the same frequency band at a relay node, sufficient separation between a received signal and a transmitted signal needs to be provided (for example, a Tx antenna and an Rx antenna need to be sufficiently separated from each other in such a manner that the Tx antenna and the Rx antenna are respectively installed on the ground and underground).

As a method for solving the aforementioned signal interference problem, there is provided a method by which the relay node does not transmit a signal to the UE while receiving a signal from the donor cell. That is, a gap can be generated in transmission from the relay node to UEs such that UEs (including legacy UEs) do not expect any transmission from the relay node during this gap. The gap can be set by configuring multicast broadcast single frequency network (MBSFN) subframes.

2. Retransmission Method Using UE-Relay

The following HARQ operation may be applied as a method for controlling data reception failure in a MIMO downlink environment.

Figure 8:
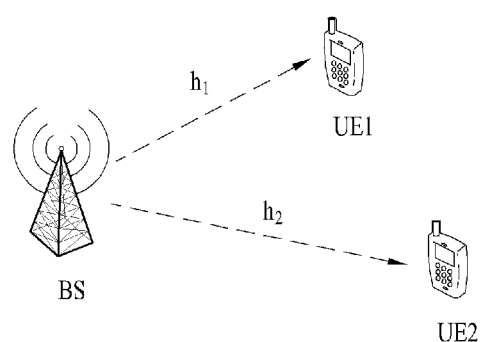
FIG. 8 illustrates an exemplary data transmission operation in a MIMO downlink environment.

FIG. 8 illustrates an exemplary data transmission operation in a MIMO downlink environment.

Referring to FIG. 8, two UEs receive information on downlink from a MIMO BS. The BS broadcasts information to UE1 and UE2 using multiple antennas. Here, the BS may transmit information through a method of pre-canceling inter-UE interference, such as dirty paper coding (DPC), ZF or the like, as described above or a precoding method such as superposition coding (SC), maximal ratio transmission (MRT) or the like. The UEs transmit NACK signals to the BS when retransmission is needed since a sufficient amount of information has not been obtained during initial transmission. When the UEs have successfully decoded information since a sufficient amount of information is obtained, the UEs transmit ACK signals to the BS. The BS retransmits information about a corresponding UE upon reception of a NACK signal from the UE and finishes information transmission upon reception of ACK signals from all UEs. In addition, the BS finishes information transmission when the number of retransmissions exceeds a maximum number L of retransmission rounds permitted by the system. In this case, when a UE has not decoded information, transmission fails. A UE (e.g. UE1), which has a relatively high-quality channel state, may rapidly accumulate a desired amount of information during a retransmission round to successfully decode information. On the contrary, a UE (e.g. UE2), which has a poor channel environment, fails to decode information during the same retransmission round. In a retransmission scheme that does not consider the retransmission method using a UE-relay, the BS transmits only information about UE2 since the BS has received the ACK signal from UE1 and the NACK signal from UE2. In this case, to maximize information transmission efficiency of UE2, information may be transmitted to UE2 through MRT beamforming for a channel between the BS and UE2, as represented by the following equation 16.

$$w = \frac{h_2^H}{\|h_2^H\|} \quad \text{[Equation 16]}$$

Since a UE-relay is not used while the BS transmits information about UE2, UE1 does not perform any operation. When the BS transmits information to UE2 through the aforementioned beamforming scheme and thus UE2 decodes the information during retransmission rounds l (≤L) and transmits an ACK signal, retransmission is finished. When target rates of UE1 and UE2 are $R_1$ and $R_2$, respectively, transmission efficiencies are as represented by the following equation 17 since UE1 and UE2 have received information during retransmission rounds l.

$$T_1 = \frac{R_1}{l}, T_2 = \frac{R_2}{l} \quad \text{[Equation 17]}$$

When UE2 has not decoded information within the maximum retransmission rounds L, the transmission rate of UE2 is 0 and the transmission rate of UE1 is $T_1=R_1/L$ since UE1 has received $R_1$ during retransmission rounds L.

In the case of a conventional HARQ retransmission scheme that does not consider a UE-relay, transmission efficiency of the system is remarkably deteriorated when a UE having a very poor channel environment is present. Since the conventional scheme transmits information only through a channel from a BS to a UE, there is high possibility of retransmission failure and thus information cannot be decoded when a channel environment of a specific UE is poor. In addition, since the BS attempts retransmission up to the maximum retransmission rounds L for a UE having a poor channel environment, transmission efficiency of other UEs in the system decrease.

The present invention provides a method for transmitting downlink data through a neighboring relay in a MIMO downlink environment. While a case in which a UE-relay is used so as to transmit data to a destination node will be described for convenience, the method provided by the present invention is applicable to a cooperative communication environment using a conventional relay as well as a UE-relay environment.

It is assumed that a BS includes multiple antennas and supports MU-MIMO transmission and each UE includes a single antenna. However, this assumption is merely an example for clarity of description and the principle of the present invention, which will be described below, can be equally applied to UEs including multiple antennas.

Figure 9:
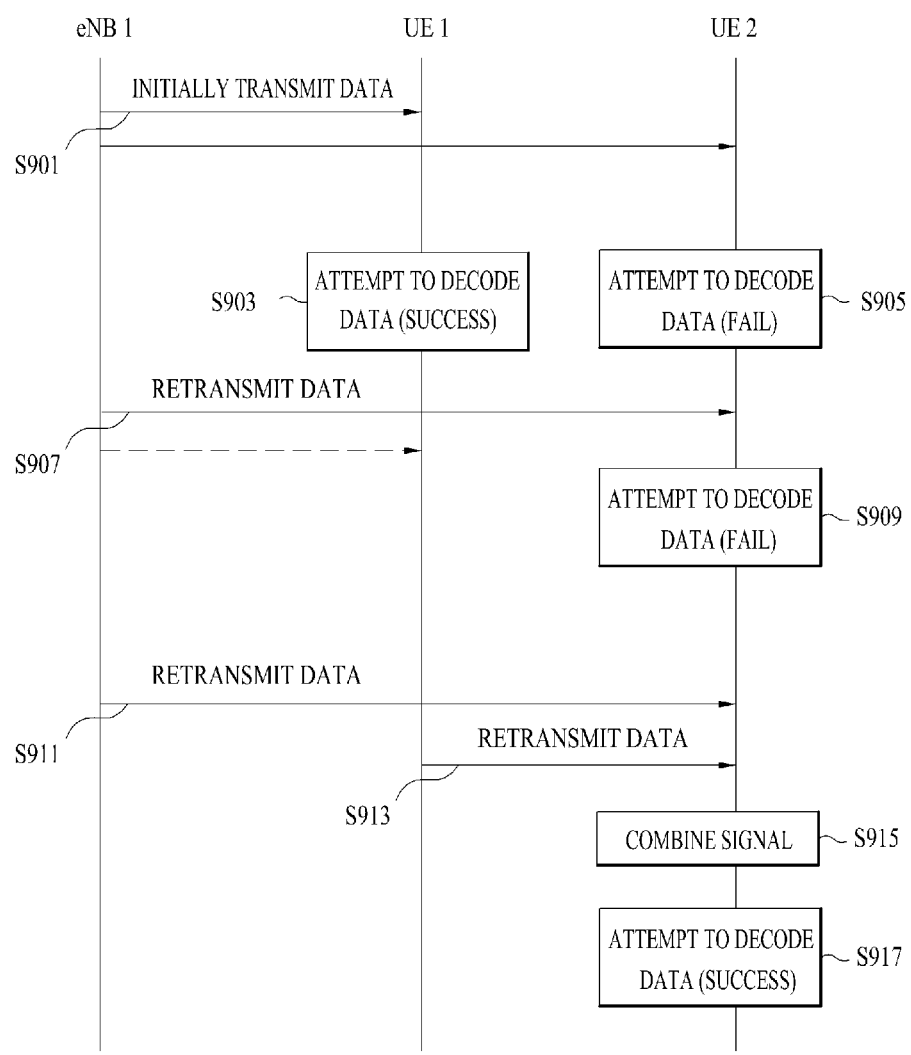
FIG. 9 is a flowchart illustrating a retransmission method using a UE-relay in a multi-antenna downlink environment according to an embodiment of the present invention.

FIG. 9 is a flowchart illustrating a retransmission method using a UE-relay in a MIMO downlink environment according to an embodiment of the present invention.

Referring to FIG. 9, the BS initially transmits information (downlink data) to UE1 and UE2 (S901 and S903) in the MIMO downlink environment. Here, the BS may broadcast the information transmitted to UE1 and UE2. In addition, the BS may transmit information to each UE using a precoding vector for preventing interference between signals transmitted to the UEs on the basis of channel state information received from each UE. Here, a method for pre-cancelling inter-UE interference, such as DPC, ZF or the like, or a precoding scheme such as MRT may be used.

UE1 and U2 attempt to decode the received data (S903 and S905). It is assumed that UE1 has successfully decoded the data and UE2 has failed to decode the data for convenience of description. UE1 transmits an ACK signal to the BS upon successful decoding of the data, whereas UE2 transmits a NACK signal to the BS upon decoding failure due to a poor channel environment.

A round $l_B$, in which the BS broadcasts information about the two UEs and a UE (UE1) having a good channel environment transmits the ACK signal to the BS upon successful decoding of the information corresponding thereto, is defined as a broadcast phase.

Upon reception of the ACK signal and the NACK signal respectively from UE1 and UE2, the BS finishes transmission of information to UE1 and retransmits only data for UE2 (S907). Here, the BS may broadcast the data with respect to UE2 to UE1 and UE2. In this case, the BS may transmit information to UE2 using a precoding vector for improving transmission efficiency with respect to UE2 on the basis of channel state information received from UE2. Furthermore, if transmission efficiency can be improved when the BS completes data transmission to UE2 via UE1 serving as a UE-relay rather than repeatedly transmitting data to UE2 having a poor channel state, then the BS may use a precoding vector capable of improving transmission efficiency with respect to UE1 on the basis of channel state information received from UE 1. In addition, if the BS can be aware of the channel state between UE1 and UE2 by receiving information on the channel state from UE1 or UE2, then the BS may additionally determine a precoding vector in consideration of the channel state between UE1 and UE2.

Subsequently, UE2 attempts to decode the received data (S909). Here, UE1 that has received the data from the BS may receive data broadcast to UE2 from the BS, which is not shown.

For convenience of description, it is assumed that UE1 has successfully decoded the data broadcast to UE2 and that UE2 has failed to decode the data. Upon decoding failure, UE2 transmits a NACK signal to the BS.

In this manner, the BS transmits only information on UE2 after UE1 has successfully decoded the information and UE1 receives information about UE2 and accumulates information. A round $l_L$, in which UE2 transmits a NACK signal to the BS since UE2 cannot accumulate a sufficient amount of information and thus cannot decode information while UE1 accumulates a sufficient amount of information and successfully decodes information before UE2 since UE1 has a good channel environment, is defined as a listening phase.

The BS and UE1, which has successfully decoded the information about UE2, simultaneously transmit the information about UE2 to UE2 in order to improve information transmission efficiency (S911 and S913). Here, the BS may transmit the information to UE2 using a precoding vector capable of improving transmission efficiency with respect to UE2 on the basis of channel state information received from UE2.

UE2 combines the signal received from the BS and the signal received from UE1 (S915). UE2 transmits an ACK signal to the BS upon successful decoding of data according to cooperative transmission of the BS and UE1 (S917).

The last round $l_C$ in which UE2 successfully receives the information thereon and transmits the ACK signal to the BS through cooperative transmission of UE1 that has decoded the information on UE2 and the BS is defined as a cooperative phase.

Figure 10:
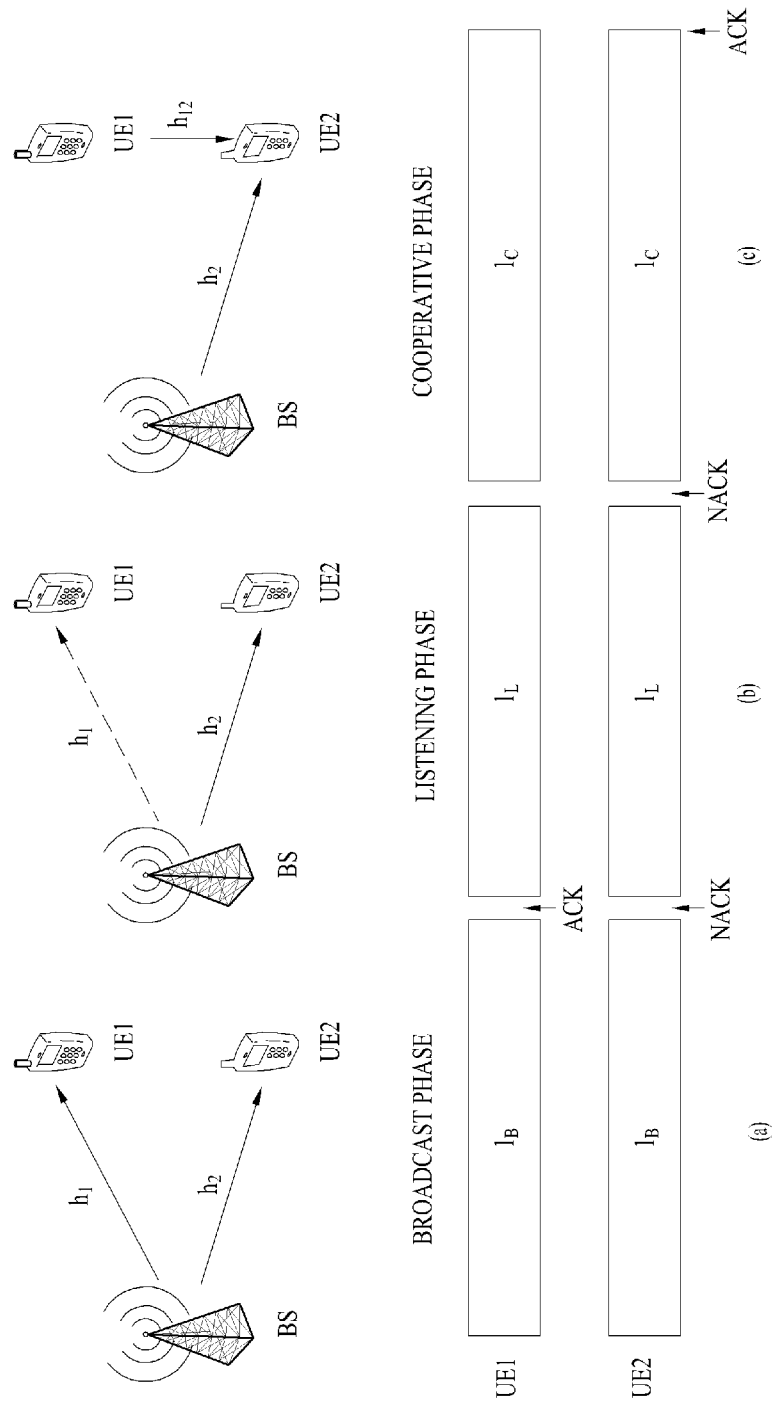
FIG. 10 illustrates respective phases in the retransmission method using a UE-relay in a multi-antenna downlink environment according to an embodiment of the present invention.

FIG. 10 illustrates the respective phases in the retransmission method using a UE-relay in a multi-antenna downlink environment according to an embodiment of the present invention.

FIG. 10(a) illustrates the broadcast phase, FIG. 10(b) illustrates the listening phase and FIG. 10(c) illustrates the cooperative phase.

Referring to FIG. 10(a), the BS may broadcast information about UE1 and UE2. Here, the BS may transmit the information about UE1 and UE2 using precoding vectors $w_{1,B}$ and $w_{2,B}$. In this case, a method of pre-canceling inter-UE interference, such as DPC, ZF or the like, or a precoding method such as SC, MRT or the like may be used. The amounts of information respectively accumulated by UE1 and UE2 during the initial round $I_B$ can be respectively represented by the following equations 18 and 19.

$$I_{1,B} = l_B \log\left(1 + \frac{P_1|h_1^T w_{1,B}|^2}{\sigma^2 + P_2|h_1^T w_{2,B}|^2}\right) \quad \text{[Equation 18]}$$

$$I_{2,B} = l_B \log\left(1 + \frac{P_2|h_2^T w_{2,B}|^2}{\sigma^2 + P_1|h_2^T w_{1,B}|^2}\right) \quad \text{[Equation 19]}$$

Here, $P_1$ and $P_2$ respectively denote powers transmitted to UE1 and UE2 from the BS and $h_1$ and $h_2$ respectively represent a channel between the BS and UE1 and a channel between the BS and UE2. In addition, $\sigma$ denotes power of additive white Gaussian noise (AWGN).

Provided target rates of UE1 and UE2 are respectively $R_1$ and $R_2$, the broadcast phase is finished when the following equations 20 and 21 are satisfied.

$$R_1 \leq I_{1,B} \quad \text{[Equation 20]}$$

$$R_2 > I_{2,B} \quad \text{[Equation 21]}$$

That is, UE1 successfully decodes the received information by accumulating sufficient information to accomplish the target rate thereof and transmits an ACK signal to the BS, whereas UE2 having a poor channel state fails to decode the received information due to insufficient information and transmits a NACK signal to the BS.

Referring to FIG. 10(b), upon reception of the ACK signal and the NACK signal respectively from UE1 and UE2, the BS finishes information transmission to UE1 and transmits only information about UE2. The BS may transmit the information about UE2 using a precoding vector $w_L$. Here, UE1 may receive information about UE2, transmitted from the BS. In addition, UE1 may receive part of the information about UE2 using successive interference cancellation (SIC) after decoding the information thereof in the broadcast phase. Accordingly, the amounts of information on UE2, respectively accumulated by UE1 and UE2 during round $l_L$, are represented by the following equations 22 and 23.

$$I_{1,L} = l_B \log\left(1 + \frac{P_2|h_1^T w_{2,B}|^2}{\sigma^2}\right) + l_L \log\left(1 + \frac{P_T|h_1^T w_L|^2}{\sigma^2}\right) \quad \text{[Equation 22]}$$

$$I_{2,L} = l_L \log\left(1 + \frac{P_T|h_2^T w_L|^2}{\sigma^2}\right) \quad \text{[Equation 23]}$$

When the amount of information on UE2, accumulated by UE1, satisfies the target rate $R_2$ of UE2, UE1 decodes the information on UE2. When UE2 fails to decode the information due to insufficient information and thus transmits a NACK signal to the BS, the listening phase is finished. That is, the listening phase is finished when the following equations 24 and 25 are satisfied.

$$R_2 \leq I_{1,L} \quad \text{[Equation 24]}$$

$$R_2 > I_{2,B} + I_{2,L} \quad \text{[Equation 25]}$$

Referring to FIG. 10(c), UE1, which has successfully decoded the information about UE2, transmits the information about UE2 simultaneously with the BS transmitting the information about UE2 so as to improve transmission efficiency with respect to UE2. Here, the BS transmits the information using a precoding vector $w_C$ and may use an MRT precoding vector as represented by the following equation 26 in order to maximize the transmission efficiency of UE2.

$$w_C^c = \frac{h_2^*}{\|h_2\|} \quad \text{[Equation 26]}$$

The quantity of information, accumulated by UE2 from the BS and UE1 during the last round $l_C$, is represented by the following equation 27.

$$I_{2,C} = l_C \log\left(1 + \frac{P_T|h_2^T w_C|^2 + P_{U_1}|h_{12}|^2}{\sigma^2}\right) \quad \text{[Equation 27]}$$

Here, $P_{U_1}$ denotes power of the signal transmitted from UE1 to UE2 and $h_{12}$ represents a channel from UE2 to UE1.

When the final quantity of information accumulated by UE2 during $I = I_B + I_L + I_C$ satisfies $R_2$, as represented by the following equation 28, UE2 may decode the corresponding information and transmit an ACK signal to the BS, resulting in completion of information transmission between the BS and UE1.

$$R_2 \leq I_{2,B} + I_{2,L} + I_{2,C} \quad \text{[Equation 28]}$$

To maximize the efficiency of the retransmission method using a UE-relay operating in the aforementioned manner, the BS may design a precoding vector. That is, a method for maximizing the transmission efficiency of UE2 at the target rate thereof is to minimize the number (length) of retransmission rounds, as represented by the following equation 29.

$$\min.\{l = l_B + l_L + l_C\} \quad \text{[Equation 29]}$$

In this case, the BS may design a precoding scheme of a new type in consideration of use of the UE-relay, distinguished from design of the conventional precoding scheme. Lengths of rounds of the respective phases are represented by the following equation 30 using the amounts of information accumulated in the respective phases.

$$l_B = \frac{R_1}{R_{1,B}^{(1)}},$$ [Equation 30]

$$l_L = \frac{R_2 - l_B R_{1,B}^{(2)}}{R_{1,L}} = \frac{R_2 - R_1 \frac{R_{1,B}^{(2)}}{R_{1,B}^{(1)}}}{R_{1,L}},$$

$$l_C = \frac{R_2 - l_B R_{2,B} - l_L R_{2,L}}{R_{2,C}} =$$

$$= \frac{R_2 - R_1 \frac{R_{2,B}}{R_{1,B}^{(1)}} - \frac{R_{2,L}}{R_{1,L}}\left(R_2 - R_1 \frac{R_{1,B}^{(2)}}{R_{1,B}^{(1)}}\right)}{R_{2,C}},$$

Here, the values used in equation 30 are defined as represented by the following equation 31.

$$R_{1,B}^{(1)} = \log\left(1 + \frac{P_1|h_1^T w_{1,B}|^2}{\sigma^2 + P_2|h_1^T w_{w,B}|^2}\right),$$ [Equation 31]

$$R_{1,B}^{(2)} = \log\left(1 + \frac{P_2|h_1^T w_{2,B}|^2}{\sigma^2}\right),$$

$$R_{2,B} = \log\left(1 + \frac{P_2|h_2^T w_{2,B}|^2}{\sigma^2 + P_1|h_2^T w_{1,B}|^2}\right),$$

$$R_{1,L} = \log\left(1 + \frac{P_T|h_1^T w_L|^2}{\sigma^2}\right),$$

$$R_{2,L} = \log\left(1 + \frac{P_T|h_2^T w_L|^2}{\sigma^2}\right),$$

$$R_{2,C} = \log\left(1 + \frac{P_T|h_2^T w_C|^2 + P_{U_1}|h_{12}|^2}{\sigma^2}\right)$$

$$= \log\left(1 + \frac{P_T\|h_2^T\|^2 + P_{U_1}|h_{12}|^2}{\sigma^2}\right).$$

The lengths of rounds of the respective phases, represented by Equation 30, are summed to obtain a total length of rounds used for retransmission, as represented by the following equation 32.

$$l = l_B + l_L + l_C$$ [Equation 32]

$$= \frac{1}{R_{2,C}}\left(R_2 + (R_{2,C} - R_{2,B})\frac{R_1}{R_{1,B}^{(1)}} + \right.$$

$$\left. \frac{1}{R_{1,L}}(R_{2,C} - R_{2,L})\left(R_2 - R_1 \frac{R_{1,B}^{(2)}}{R_{1,B}^{(1)}}\right)\right)$$

Design of precoding for minimizing the number (length) of rounds used for retransmission, obtained as above, may be achieved through joint optimization as represented by Equation 33.

$$\min \cdot \mathcal{J}_{co} = \frac{R_{2,C} - R_{2,B}}{R_{1,B}^{(1)}} + \frac{R_{2,C} - R_{2,L}}{R_{1,L}}\left(\frac{R_2}{R_1} - \frac{R_{1,B}^{(2)}}{R_{1,B}^{(1)}}\right)$$ [Equation 33]

Precoding vector $w_L$ in the listening phase may be obtained as represented by the following equation 34, independently of precoding design in the broadcast phase.

$$\min_{\|w_L\|^2=1} \cdot \mathcal{J}_L = \frac{R_{2,C} - R_{2,L}}{R_{1,L}}$$ [Equation 34]

The precoding vector in the listening phase can be calculated as represented by Equation 34. When a value optimized through the calculated precoding vector is defined as $J_L^*$, optimized precoding vectors in the broadcast phase may be obtained as represented by the following equation 35.

$$\min_{\|w_{1,B}\|^2=\|w_{2,B}\|^2=1} \cdot \mathcal{J}_{co} = \frac{R_{2,C} - R_{2,B}}{R_{1,B}^{(1)}} + \mathcal{J}_L^*\left(\frac{R_2}{R_1} - \frac{R_{1,B}^{(2)}}{R_{1,B}^{(1)}}\right)$$ [Equation 35]

Consequently, precoding design for minimizing the number of retransmission rounds of the system can be divided into independent precoding designs in the broadcast phase and the listening phase and sequentially performed.

3. Apparatus to which the Present Invention is Applicable

Figure 11:
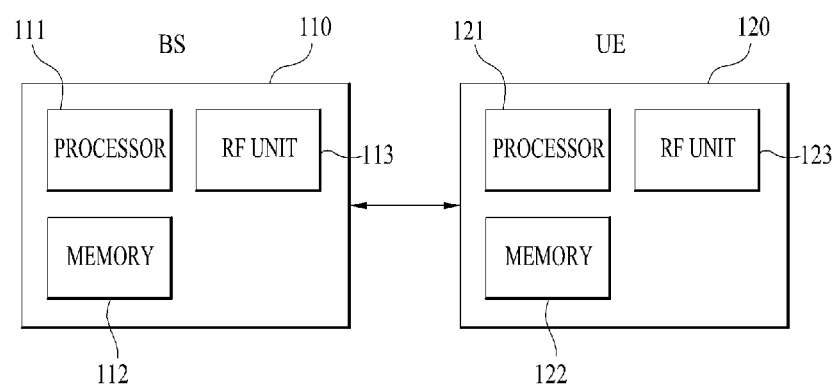
FIG. 11 is a block diagram of a wireless communication system according to an embodiment of the present invention.

FIG. 11 is a block diagram of a wireless communication system according to an embodiment of the present invention.

Referring to FIG. 11, the wireless communication system includes a BS 110 and a plurality of UEs 120 located in the coverage area of the BS 110.

The BS 110 includes a processor 111, a memory 112 and a radio frequency (RF) unit 113. The processor 111 is configured to implement functions, procedures and/or methods proposed by the present invention. Radio interface protocol layers may be implemented by the processor 111. The memory 112 is connected to the processor 111 and stores various types of information for operating the processor 111. The RF unit 113 is connected to the processor 111 and transmits and/or receives radio signals.

The UE 120 includes a processor 121, a memory 122 and a radio frequency (RF) unit 123. The processor 121 is configured to implement functions, procedures and/or methods proposed by the present invention. Radio interface protocol layers may be implemented by the processor 121. The memory 122 is connected to the processor 121 and stores various types of information for operating the processor 121. The RF unit 123 is connected to the processor 121 and transmits and/or receives radio signals.

The memories 112 and 122 may be provided to the inside or outside of the processors 111 and 121 and connected to the processors 111 and 121 through various known means. In addition, the BS 110 and/or the UE 120 may include a single antenna or multiple antennas.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit data to and receive data from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the method for transmitting and receiving data in a wireless access system according to the present invention is applied to 3GPP LTE in the aforementioned embodiments, the method can be applied to various wireless access systems other than 3GPP LTE.

The invention claimed is:

1. A method for transmitting, by a base station (BS) serving a first user equipment (UE) and a second UE, data in a wireless access system, the method comprising:
a broadcast step for receiving an acknowledgement (ACK) signal regarding a first data from the first UE and receiving a negative acknowledgement (NACK) signal regarding a second data from the second UE, after transmitting the first data to the first UE using a first precoding vector $w_{1,B}$ and transmitting the second data to the second UE using a second precoding vector $w_{2,B}$;
a listening step for receiving an ACK signal regarding the second data, which is for the second UE, from the first UE and receiving a NACK signal regarding the second data from the second UE, after transmitting the second data to the first UE, in order to transmit the second data to the second UE via the first UE, and the second UE using a third precoding vector $w_L$; and
a cooperative step for transmitting the second data to the second UE, in cooperation with the first UE, using a fourth precoding vector $w_C$ determined to maximize transmission efficiency of the second UE.

2. The method according to claim 1, wherein a round length $l_B$ of the broadcast step, a round length $l_L$ of the listening step and a round length $l_C$ of the cooperative step are determined by Equations 1 and 2, $$l_B = \frac{R_1}{R_{1,B}^{(1)}}, \qquad \langle \text{Equation 1} \rangle$$

$$l_L = \frac{R_2 - l_B R_{1,B}^{(2)}}{R_{1,L}} = \frac{R_2 - R_1 \frac{R_{1,B}^{(2)}}{R_{1,B}^{(1)}}}{R_{1,L}},$$

$$l_C = \frac{R_2 - l_B R_{2,B} - l_L R_{2,L}}{R_{2,C}}$$

$$= \frac{R_2 - R_1 \frac{R_{2,B}}{R_{1,B}^{(1)}} - \frac{R_{2,L}}{R_{1,L}}\left(R_2 - R_1 \frac{R_{1,B}^{(2)}}{R_{1,B}^{(1)}}\right)}{R_{2,C}},$$

$$R_{1,B}^{(1)} = \log\left(1 + \frac{P_1 |h_1^T w_{1,B}|^2}{\sigma^2 + P_2 |h_1^T w_{2,B}|^2}\right), \qquad \langle \text{Equation 2} \rangle$$

$$R_{1,B}^{(2)} = \log\left(1 + \frac{P_2 |h_1^T w_{2,B}|^2}{\sigma^2}\right),$$

$$R_{2,B} = \log\left(1 + \frac{P_2 |h_2^T w_{2,B}|^2}{\sigma^2 + P_1 |h_2^T w_{1,B}|^2}\right),$$

$$R_{1,L} = \log\left(1 + \frac{P_T |h_1^T w_L|^2}{\sigma^2}\right),$$

$$R_{2,L} = \log\left(1 + \frac{P_T |h_2^T w_L|^2}{\sigma^2}\right),$$

$$R_{2,C} = \log\left(1 + \frac{P_T |h_2^T w_C|^2 + P_{U_1} |h_{12}|^2}{\sigma^2}\right)$$

$$= \log\left(1 + \frac{P_T \|h_2^T\|^2 + P_{U_1} |h_{12}|^2}{\sigma^2}\right),$$

wherein $P_1$ and $P_2$ respectively denote powers of signals transmitted from the BS to the first UE and from the BS to the second UE, $P_T$ denotes power of a signal transmitted from the BS in the listening step and the cooperative step, $h_1$ and $h_2$ respectively represent a channel from the BS to the first UE and a channel from the BS to the second UE, and $\sigma$ represents power of additive white Gaussian noise.

3. The method according to claim 2, wherein the third precoding vector $w_L$ is determined by Equation 3, $$\min_{\|w_L\|^2=1} \cdot \mathcal{J}_L = \frac{R_{2,C} - R_{2,L}}{R_{1,L}}. \qquad \langle \text{Equation 3} \rangle$$

4. The method according to claim 3, wherein the fourth precoding vector $w_C$ is determined by Equation 4, $$\min_{\|w_{1,B}\|^2=\|w_{2,B}\|^2=1} \cdot \mathcal{J}_{co} = \frac{R_{2,C} - R_{2,B}}{R_{1,B}^{(1)}} + \mathcal{J}_L^*\left(\frac{R_2}{R_1} - \frac{R_{1,B}^{(2)}}{R_{1,B}^{(1)}}\right), \qquad \langle \text{Equation 4} \rangle$$

wherein $\mathcal{J}_L^*$ denotes a value determined by Equation 3.

5. A base station (BS), serving a first user equipment (UE) and a second UE, and configured to transmit data in a wireless access system, the BS comprising:

a radio frequency (RF) unit configured to transmit and receive radio signals; and a processor operably coupled to the RF unit, the processor configured to:

control a broadcast step for receiving an acknowledgement (ACK) signal regarding a first data from the first UE and receiving a negative acknowledgement (NACK) signal regarding a second data from the second UE, after transmitting the first data to the first UE using a first precoding vector $w_{1,B}$ and transmitting the second data to the second UE using a second precoding vector $W_{2,B}$, control a listening step for receiving an ACK signal regarding the second data, which is for the second UE, from the first UE and receiving a NACK signal regarding the second data from the second UE, after transmitting the second data to the first UE, in order to transmit the second data to the second UE via the first UE, and the second UE using a third precoding vector $W_L$, and control a cooperative step for transmitting the second data to the second UE, in cooperation with the first UE, using a fourth precoding vector $w_C$ determined to maximize transmission efficiency of the second UE.

6. The BS according to claim 5, wherein a round length $l_B$ of the broadcast step, a round length $l_L$ of the listening step and a round length $l_C$ of the cooperative step are determined by Equations 1 and 2, $$l_B = \frac{R_1}{R_{1,B}^{(1)}}, \qquad \langle\text{Equation 1}\rangle$$

$$l_L = \frac{R_2 - l_B R_{1,B}^{(2)}}{R_{1,L}} = \frac{R_2 - R_1 \frac{R_{1,B}^{(2)}}{R_{1,B}^{(1)}}}{R_{1,L}},$$

$$l_C = \frac{R_2 - l_B R_{2,B} - l_L R_{2,L}}{R_{2,C}}$$

$$= \frac{R_2 - R_1 \frac{R_{2,B}}{R_{1,B}^{(1)}} - \frac{R_{2,L}}{R_{1,L}}\left(R_2 - R_1 \frac{R_{1,B}^{(2)}}{R_{1,B}^{(1)}}\right)}{R_{2,C}},$$

$$R_{1,B}^{(1)} = \log\left(1 + \frac{P_1|h_1^T w_{1,B}|^2}{\sigma^2 + P_2|h_1^T w_{2,B}|^2}\right), \qquad \langle\text{Equation 2}\rangle$$

$$R_{1,B}^{(2)} = \log\left(1 + \frac{P_2|h_1^T w_{2,B}|^2}{\sigma^2}\right),$$

$$R_{2,B} = \log\left(1 + \frac{P_2|h_2^T w_{2,B}|^2}{\sigma^2 + P_1|h_2^T w_{1,B}|^2}\right),$$

$$R_{1,L} = \log\left(1 + \frac{P_T|h_1^T w_L|^2}{\sigma^2}\right),$$

$$R_{2,L} = \log\left(1 + \frac{P_T|h_2^T w_L|^2}{\sigma^2}\right),$$

$$R_{2,C} = \log\left(1 + \frac{P_T|h_2^T w_C|^2 + P_{U_1}|h_{12}|^2}{\sigma^2}\right)$$

$$= \log\left(1 + \frac{P_T\|h_2^T\|^2 + P_{U_1}|h_{12}|^2}{\sigma^2}\right),$$

wherein $P_1$ and $P_2$ respectively denotes powers of signals respectively transmitted from the BS to the first UE and from the BS to the second UE, $P_T$ denotes power of a signal transmitted from the BS in the listening step and the cooperative step, $h_1$ and $h_2$ respectively represent a channel from the BS to the first UE and a channel from the BS to the second UE, and $\sigma$ represents power of additive white Gaussian noise.

7. The BS according to claim 6, wherein the third precoding vector $w_L$ is determined by Equation 3, $$\min_{\|w_L\|^2=1} \cdot \mathcal{J}_L = \frac{R_{2,C} - R_{2,L}}{R_{1,L}}. \qquad \langle\text{Equation 3}\rangle$$

8. The BS according to claim 7, wherein the fourth precoding vector $w_C$ is determined by Equation 4, $$\min_{\|w_{1,B}\|^2=\|w_{2,B}\|^2=1} \cdot \mathcal{J}_{co} = \frac{R_{2,C} - R_{2,B}}{R_{1,B}^{(1)}} + \mathcal{J}_L^*\left(\frac{R_2}{R_1} - \frac{R_{1,B}^{(2)}}{R_{1,B}^{(1)}}\right), \qquad \langle\text{Equation 4}\rangle$$

wherein $\mathcal{J}_L^*$ denotes a value determined by Equation 3.

\* \* \* \* \*